US006052051A

United States Patent [19]

Whalen

[11] Patent Number: 6,052,051

[45] **Date of Patent: *Apr. 18, 2000**

[54] MULTILOCATION DEFENSE DEVICE

[76] Inventor: Patrick J. Whalen, 2052 Cedardale Ave., Baton Rouge, La. 70808

[ * ] Notice: This patent is subject to a terminal disclaimer.

[21] Appl. No.: 08/916,272

[22] Filed: Feb. 23, 1999

[51] Int. Cl.[7] .................... B60Q 1/00

[52] U.S. Cl. .................... 340/425.5; 340/321; 340/332; 340/539; 362/102; 222/1; 222/79; 222/113; 222/192; 222/402.11

[58] Field of Search .................... 340/425.5, 574, 340/573, 321, 426, 539, 540, 691, 652, 693, 331, 332, 333, 384.1, 384.7, 384.6, 384.5; 362/102, 109; 222/1, 79, 113, 192, 402.11

[56] References Cited

U.S. PATENT DOCUMENTS

| | | | |
|---|---|---|---|
| 3,825,833 | 7/1974 | Bogue et al. | 325/119 |
| 4,535,324 | 8/1985 | Leventhal | 340/574 |
| 4,591,836 | 5/1986 | Feigenblatt, Jr. et al. | 340/574 |
| 4,694,284 | 9/1987 | Leveille et al. | 340/574 |
| 4,719,454 | 1/1988 | Hopkins et al. | 340/574 |
| 4,736,196 | 4/1988 | McMahon et al. | 340/573 |
| 4,737,758 | 4/1988 | Meiksin et al. | 340/51 |
| 4,843,336 | 6/1989 | Kuo | 340/521 |
| 4,990,892 | 2/1991 | Guest et al. | 340/573 |
| 4,998,095 | 3/1991 | Shields | 340/574 |
| 5,086,377 | 2/1992 | Roberts | 362/102 |
| 5,254,970 | 10/1993 | Brady | 340/328 |
| 5,337,041 | 8/1994 | Friedman | 340/573 |
| 5,357,254 | 10/1994 | Kah, Jr. | 342/42 |
| 5,420,766 | 5/1995 | Hollis | 362/96 |
| 5,457,440 | 10/1995 | Daddono | 340/573 |
| 5,475,368 | 12/1995 | Collins | 340/573 |
| 5,497,149 | 3/1996 | Fajt | 340/988 |
| 5,531,344 | 7/1996 | Winner | 340/574 |
| 5,546,072 | 8/1996 | Creuseremee et al. | 340/574 |
| 5,549,220 | 8/1996 | Whalen | 222/1 |
| 5,587,704 | 12/1996 | Foster | 340/573 |
| 5,629,679 | 5/1997 | Crawford et al. | 340/574 |
| 5,635,908 | 6/1997 | Soper | 340/574 |
| 5,652,569 | 7/1997 | Gerstenberger et al. | 340/573 |

*Primary Examiner*—Nina Tong

[57] ABSTRACT

A multilocation defense device which simultaneously protects self and property. The hand-held device includes a remote-control mechanism for remotely activating an alarm system in a home, building, and/or motor vehicle, and a source of high-intensity sound emanating from the defense device, which can be electronically programmed to send an "S.O.S." signal in Morse code. Further defense of self is provided by bright lights and a spray of a chemical repellent.

3 Claims, 2 Drawing Sheets

MULTILOCATION DEFENSE DEVICE

BACKGROUND OF THE INVENTION

The present invention relates to personal defense. More particularly, the invention relates to personal defense of oneself and one's property.

The prior art discloses numerous hand-held devices for self-defense. However, these devices fail to provide for the protection of one's property such as a home and/or a motor vehicle. A need therefore exists for a hand-held device which provides simultaneous protection for a person and a person's property. The present invention provides such a device, which at the same time provides a greater degree of self-protection than the previously-disclosed prior-art devices.

SUMMARY OF THE INVENTION

In general, the present invention in a first aspect provides a multilocation defense device comprising (a) an external housing constructed and arranged for hand manipulation and support; (b) an electrical battery to provide electrical power for the device; (c) a remote-control mechanism for remotely activating an alarm system in a home, building, and/or motor vehicle; (d) a source of high-intensity sound; and (e) means for activating the remote-control mechanism and the source of high-intensity sound.

In a second aspect the invention provides a method for the defense of self and property. The method comprises (a) providing a first alarm system disposed in a manual defense device; (b) providing a second alarm system in a home, building, or motor vehicle; (c) disposing within the manual defense device a mechanism for remotely activating the second alarm system; and (d) activating the first and second alarm systems.

DETAILED DESCRIPTION OF THE INVENTION

In this application the term "multilocation defense device" is defined as a device which is operated from a single location to protect self and property in at least two locations. The term "manual" is defined as constructed and arranged to be operated and supported by the hand.

Figure 1:
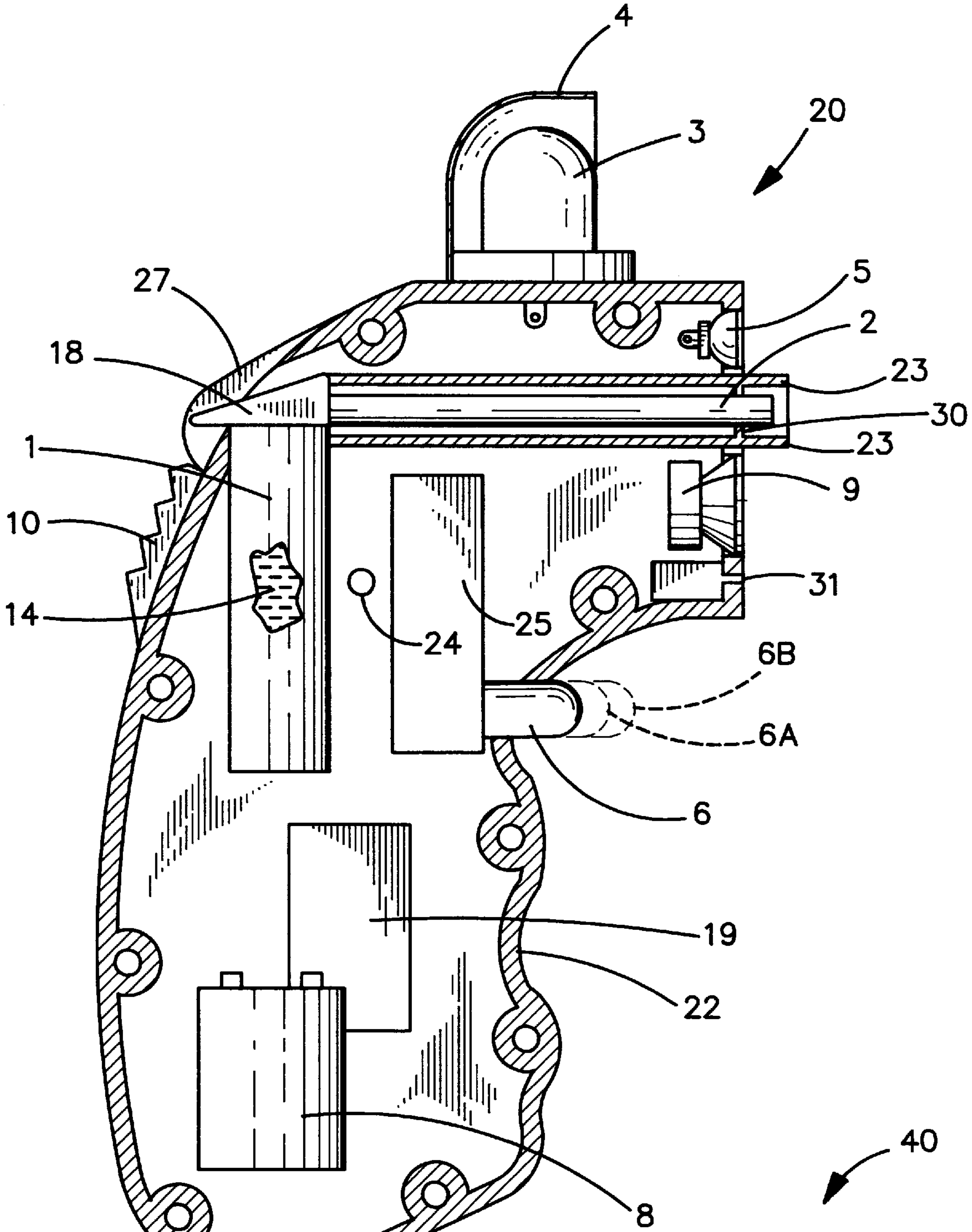
FIG. 1 is a cross-sectional view, partly schematic, of a multilocation defense device made in accordance with the principles of the present invention.
Figure 2:
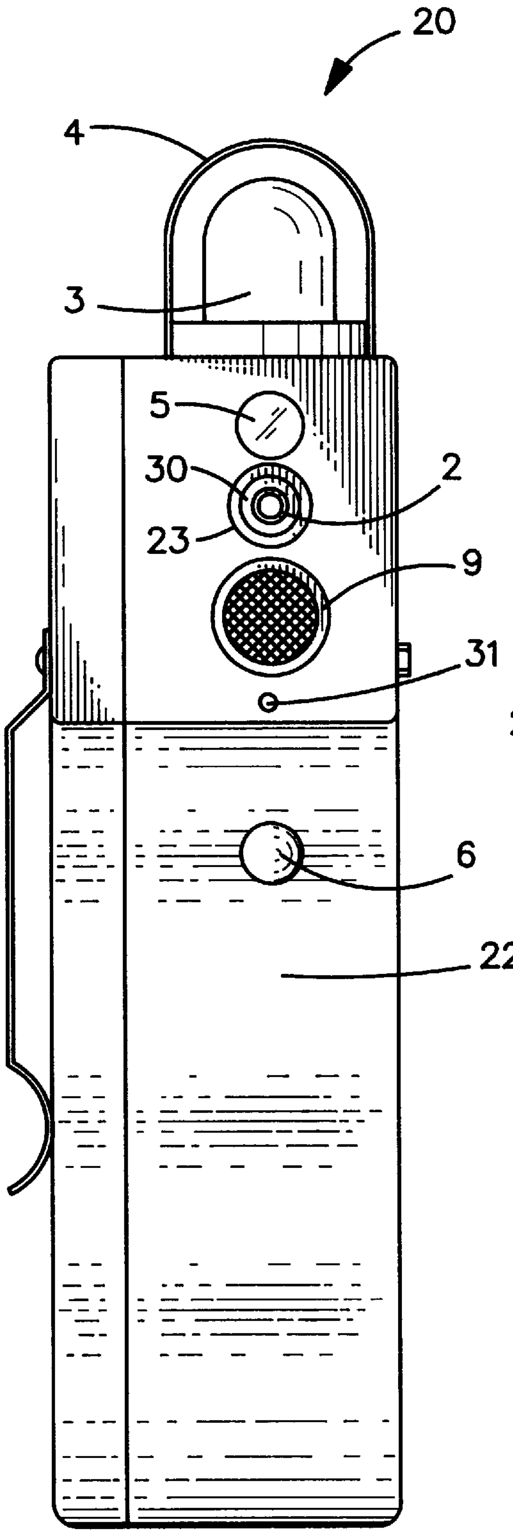
FIG. 2 is a front view of the device shown in FIG. 1.
Figure 3:
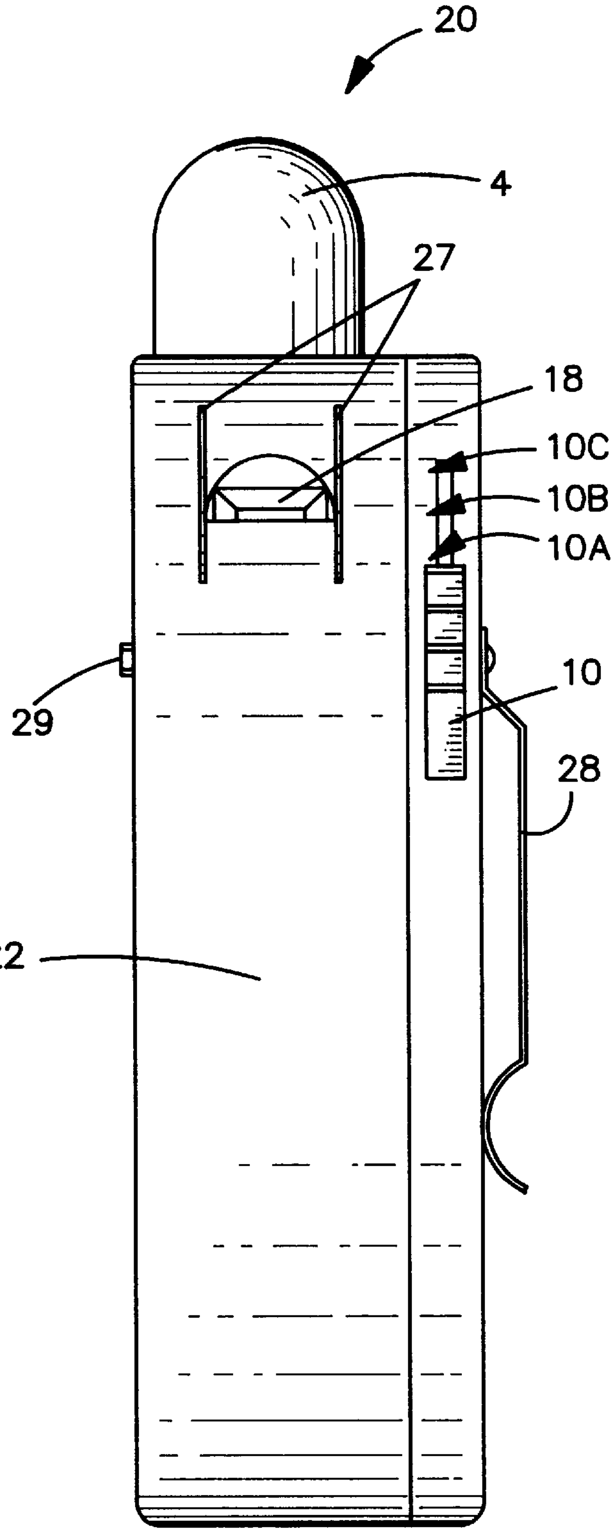
FIG. 3 is a rear view of the device shown in FIG. 1.

More specifically, reference is made to FIGS. 1–3, in which is shown a multilocation defense device made in accordance with the principles of the present invention, and generally designated by the numeral 20.

An external housing 22 is shaped for hand manipulation and support. An electrical storage battery 8 provides electrical power for the device 20, which includes an incandescent lamp as a source 5 for emitting a directional, steady, intense beam of white light. The device 20 further includes a source 3 for emitting a high-intensity intermittent blue flashing light; a shield 4 to prevent the user from being blinded by the flashing blue light; a source 9 of high-intensity sound; a pressurized container 1 of a chemical repellent 14; and a straight and narrow tube 2 for conveying the chemical repellent 14 from the container 1 to the exterior of the multilocation defense device 20.

A two-stage button 6, in a first position **6*a* turns on the white light; and in a second position 6*b*** turns on the white light, the blue light, and the sound.

A control lever 18 discharges a spray of the chemical repellent 14 when the lever 18 is depressed. The repellent 14 is discharged through the tube 2 which, being straight and narrow, provides an extended range for the repellent 14. Preferably, the tube 2 is detachable, for easy removal and cleaning.

Figure 4:
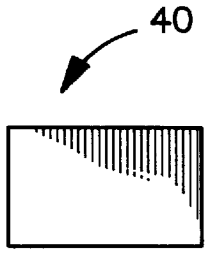
FIG. 4 is a schematic representation of an alarm system for a home, a building, or a motor vehicle.

A sliding button 10 operates a remote-control mechanism 19 comprising electronic means which activate a remote alarm system 40 (FIG. 4) located in a home, a building, or a motor vehicle. In a first position **10*a* the alarm system 40 is "off." In a second position 10*b* the alarm system 40 is "on," and will respond to and be triggered by entry of the home, building, or motor vehicle. In a third position 10*c* the button 10 activates and sets off the alarm system 40** in the home, building, or motor vehicle.

Electronic means 25 are responsive to the second position **6*b* of the two-stage button 6, by triggering the release of high-intensity sound from the source 9. The electronic means 25** can be programmed to send an "S.O.S." signal in Morse code.

A shroud 23 protects the spray tube 2 from being damaged.

Openings 24 in the left and right sides of the external housing 22 are provided for the attachment of spring metal clips 28 by screws (not shown) to the external housing 22.

A pair of earlike members 27 protect the control lever 18 from damage, snagging, or accidental activation.

Any chemical repellent which is not lethal and which does not cause permanent blindness may be used. The preferred repellent is a one to five percent solution by weight of oleo resin capsicum (red pepper) in a halocarbon, pressurized with nitrogen, marketed under the trademark "Gazgun".

A suitable system for discharging a spray of the repellent 14 from the container 1 is described by Cantor, U.S. Pat. No. 4,186,851, which is hereby incorporated by reference. This patent likewise describes visual and auditory systems for emitting a high-intensity beam of white light and high-intensity sound.

The source 3 of intermittent, diffuse blue light is preferably an incandescent lamp provided with a blue filter. The button 6 in the second position **6*b* functions as an on/off electrical switch for the source 3** of blue light.

The device 20 is beneficially provided with a threaded countersunk metal nut 29, constructed and arranged to receive a screw, for attaching the clip 28 to either side of the external housing 22 by a screw (not shown). Removable guide means 30 for the spray tube 2 enables a standard can of repellent 14 to be installed if the tube 2 is lost.

A transmitter 31 transmits an electronic signal from the remote-control mechanism 19 to a remote alarm system 40.

Even if the tube 2 is not in the device 20, the repellent 14 will still spray out of the housing 22, due to sufficient room being provided therein for downward movement of the nozzle (not shown), without the spray striking the interior of the device 20.

The direction of the spray of repellent 14 is beneficially guided by the steady beam of white light emitted by the lamp 5, which serves to locate and illuminate a potential attacker. The steady beam of white light is preferably directed at the eyes of the potential assailant, with the effect of partially and temporarily blinding that individual.

The clip 28 allows left or right-handed use of the device 20 by attachment to a belt, an inside pocket, or a woman's purse, for example. This feature enables the user to activate the device 20 from a place of concealment.

When the control lever 18 is depressed, the nozzle (not shown) is moved downward. Hence it is important that the tube 2 be flexible, and to be made of a flexible material such as a flexible plastic. For the same reason, it is also important that the tube 2 protrude a sufficient distance from the external housing 22, so that when the lever 18 is depressed and the tube 2 is drawn downward, the end of the tube 2 still projects from the external housing 22.

Preferably, the housing 22 is colored a bright orange, to inform potential attackers that the defense device 20 is not a pistol.

It sometimes happens that a person feels threatened by an individual who is between the person and the person's home and/or automobile. The present invention is particularly suited to this type of situation. Using the device 20, the person who feels threatened can activate, simultaneously, the hand-held alarm system and the home and/or vehicle alarm system(s) 40. The hand-held alarm system will function to prevent personal attack, while the auto and/or home alarm system(s) function(s) to prevent entry of the home and/or automobile. Moreover, the individual from whom the threat is perceived will be trapped between the two or three alarm systems, with synergistic effect.

Another advantage of the present invention is that a person who is upstairs and who hears a suspicious noise downstairs can, using the device 20, trigger and set off a house alarm 40 downstairs without exposing himself or herself to danger by going downstairs to do so.

A still further advantage is that a person leaving a home or building in the dark of night and seeing a suspicious individual lurking by his or her automobile can, using the device 20, set off the car alarm 40 without revealing himself or herself to the intruder.

I claim:

1. A multilocation defense device, comprising:

(a) an external housing constructed and arranged for hand manipulation and support;

(b) an electrical battery to provide electrical power for the device;

(c) a remote-control mechanism for remotely activating an alarm system in a home, building, and/or motor vehicle by transmitting an electronic signal from the remote-control mechanism to the alarm system in the home, building, and/or motor vehicle;

(d) a source of high-intensity sound;

(e) means for activating the remote-control mechanism and the source of high-intensity sound, thereby activating and setting off the alarm system in the home, building and/or motor vehicle, simultaneously preventing both personal attack and entry of the home, building, and/or motor vehicle, and engaging an individual from whom a threat is perceived between the alarm systems, with synergisitc effect;

(f) a pressurized container of a chemical repellent;

(g) means for discharging the chemical repellent from the pressurized container, when the discharge of the repellent is intended;

(h) a flexible straight and narrow tube for conveying the repellent from the pressurized container to the exterior of the multilocation defense device, to provide an extended range for the repellent; and (i) an incandescent lamp as a source for emitting a directional, steady, intense beam of white light, for locating, illuminating, and partially and temporarily blinding a potential attacker or assailant, and for guiding the discharged repellent to the eyes of the potential attacker or assailant, thereby temporarily blinding the potential attacker or assailant, the lamp and the tube being aligned in a parallel proximate arrangement.

2. A manual device for self-defense, comprising:

(a) an external housing constructed and arranged for hand manipulation and support;

(b) an electrical battery to provide electrical power for the device;

(c) a pressurized container of a chemical repellent;

(d) means for discharging the chemical repellent from the pressurized container;

(e) a flexible straight and narrow tube for conveying the repellent from the pressurized container to the exterior of the device, to provide an extended range for the repellent; and (f) an incandescent lamp for emitting a directional, steady, intense beam of white light, for locating, illuminating, and partially and temporarily blinding a potential attacker or assailant, and for guiding the discharged repellent to the eyes of the potential attacker or assailant, thereby temporarily blinding the potential attacker or assailant, the lamp and the tube being aligned in a parallel proximate arrangement.

3. A multilocation defense device, comprising:

a) an external housing constructed and arranged for hand manipulation and support;

b) an electrical battery to provide electrical power for the device;

c) a pressurized container of a chemical repellent with a straight narrow tube;

d) means for discharging the chemical repellent from the pressurized container to the exterior of the device, to provide an extended range for the repellent;

e) a source of high-intensity sound; and f) an incandescent lamp as a source for emitting a directional, steady, intense beam of white light which may be used as a guide;

g) a source for emitting a high-intensity intermittent flashing blue light;

h) electronic means for activating the source of high-intensity sound, said electronic means being programmable to send an "S.O.S" signal in Morse code.

* * * * *